United States Patent
Iwase (10) Patent No.: US 9,478,784 B2
(45) Date of Patent: Oct. 25, 2016

(54) NONAQUEOUS ELECTROLYTE SECONDARY BATTERY

(71) Applicant: Kosuke Iwase, Nagoya (JP)

(72) Inventor: Kosuke Iwase, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 345 days.

(21) Appl. No.: 14/096,441

(22) Filed: Dec. 4, 2013

(65) Prior Publication Data

US 2014/0170464 A1    Jun. 19, 2014

(30) Foreign Application Priority Data

Dec. 14, 2012 (JP) .................................. 2012-273817

(51) Int. Cl.
H01M 2/16 (2006.01)

(52) U.S. Cl.
CPC ........... *H01M 2/1686* (2013.01); *H01M 2/166* (2013.01); *H01M 2/1666* (2013.01); *H01M 2/1646* (2013.01); *Y02E 60/122* (2013.01)

(58) Field of Classification Search
CPC .......................... H01M 2/1666; H01M 2/1686
USPC .................................................. 429/142, 144
See application file for complete search history.

(56) References Cited

U.S. PATENT DOCUMENTS 6,949,315 B1 * 9/2005 Samii ................. B01D 67/0009
429/142

| | | | | |
|---|---|---|---|---|
| 2009/0325058 A1 * | 12/2009 | Katayama | ................ | H01G 9/02 429/142 |
| 2010/0015510 A1 * | 1/2010 | Tanaka | ................ | H01M 2/1673 429/94 |
| 2010/0178544 A1 | 7/2010 | Nishikawa | | |

FOREIGN PATENT DOCUMENTS

JP      2012-014884 A    1/2012
WO    WO 2008/149895 A1    12/2008

OTHER PUBLICATIONS

"Plastic Pocket Book", Kogyo Chosakai Publishing Co., Ltd., pp. 124-125, 2003.
"New Polymer Dictionary", Asakura Publishing Co., Ltd., 1st Edition, p. 324, 1988.
Jan. 27, 2015 Office Action issued in Japanese Application No. 2012-273817.

* cited by examiner

*Primary Examiner* — Kenneth Douyette
*Assistant Examiner* — James Erwin
(74) *Attorney, Agent, or Firm* — Oliff PLC (57) ABSTRACT

A nonaqueous electrolyte secondary battery includes an electrode body, a non-aqueous electrolyte and a porous heat resistance layer. The electrode body is provided with a positive electrode and a negative electrode that face each other through a separator. The porous heat resistance layer is disposed at least in one of a space between the positive electrode and the separator and a space between the negative electrode and the separator and contains an inorganic filler. A porosity of the separator is not less than 70% by volume and not more than 80% by volume. A ratio of a porosity of the porous heat resistance layer with respect to the porosity of the separator is not less than 0.3 and not more than 0.6.

12 Claims, 6 Drawing Sheets

POROSITY OF SEPARATOR A (% BY VOLUME)

FIG. 7

HRL POROSITY (B)/
SEPARATOR POROSITY (A)

FIG. 8

NONAQUEOUS ELECTROLYTE SECONDARY BATTERY

INCORPORATION BY REFERENCE

The disclosure of Japanese Patent Application No. 2012-273817 filed on Dec. 14, 2012 including the specification, drawings and abstract is incorporated herein by reference in its entirety.

BACKGROUND OF THE INVENTION

1. Field of the Invention

The present invention relates to a nonaqueous electrolyte secondary battery provided with a porous heat resistance layer between a separator and an electrode.

2. Description of Related Art

Nonaqueous electrolyte secondary batteries such as lithium ion secondary batteries and nickel hydrogen batteries are recently used as so-called portable power sources for personal computers and portable terminals and vehicle driving power sources. In particular, lithium ion secondary batteries that are lightweight and can afford high energy density are preferably used as high output vehicle driving power sources of electric cars and hybrid cars.

In a typical structure of a nonaqueous electrolyte secondary battery, an electrode body in which a positive electrode and a negative electrode face each other through a separator is housed in a battery case together with a non-aqueous electrolyte. The separator is generally formed of a porous sheet of a resin such as polyolefin and has a function of electrically insulating the positive electrode and negative electrode, a function of holding the non-aqueous electrolyte, and a shut-down function. The shut-down function is a function such that when the inside of the battery is overheated to reach a specified temperature range (typically, a softening temperature of the separator), the separator is softened, and a conduction path of charge carriers is shut down. In addition, the separator is also required to have heat-resistance (endurance) of a specified level. That is, even when the inside of the battery is overheated to the softening temperature or more of the separator and the separator is subject to thermal shrinkage or breakage, it is necessary to prevent the internal short circuit from occurring. As means for responding to such a requirement, a structure in which a porous heat resistance layer (HRL) is formed on a surface of a resinous porous separator is proposed. The porous heat resistance layer is typically mainly formed of particles of an inorganic compound (inorganic filler) and has high heat resistance and insulation properties (nonconductive properties). In WO2008/149895 A, for example, a structure where a polyolefin microporous membrane having the porosity of 35 to 50% by volume is used as a separator, and a porous heat resistance layer is formed on a surface of the separator is disclosed.

SUMMARY OF THE INVENTION

When a nonaqueous electrolyte secondary battery is produced, from the outside (constituent members of an equipment used to produce an electrode, for example), foreign matters (typically, metallic foreign matters such as copper and iron) may enter the nonaqueous electrolyte secondary battery. When the foreign matter is present in a vicinity of a surface of the electrode, for example, the separator is broken and causes very small internal short circuit in the battery, and battery performance may be degraded (for example, a decrease in a battery voltage) due to the short circuit. According to the study of the present inventors, in a technology described in WO2008/149895 A, in particular when a magnitude of the foreign matter is relatively small (for example a case where a diameter $\Phi$ of the foreign matter is 50 µm or less, or a case where a tip of the foreign matter is very sharp), it may be difficult to handle occurrence of such internal short circuit. The present invention was conducted in view of such a situation and provides a nonaqueous electrolyte secondary battery in which the internal short circuit is less likely to occur due to the foreign matter that enters the battery and which is excellent in the reliability and endurance.

To the foreign matter present in the vicinity of the surface of the electrode, during preparation of the electrode body or during the use thereof (during charge/discharge), for example, a stress higher than its peripheral portions can be applied. Accordingly, the separator may be broken by such a stress. Therefore, the present inventors considered to reduce the stress possibly applied to the foreign matter to reduce occurrence of the internal short circuit and completed the present invention. A nonaqueous electrolyte secondary battery that is an aspect of the present invention includes: an electrode body that is provided with a positive electrode and a negative electrode that face with each other through a separator; a non-aqueous electrolyte; and a porous heat resistance layer. The porous heat resistance layer is disposed in at least one of a space between the positive electrode and the separator and a space between the negative electrode and the separator, and includes an inorganic filler. A porosity of the separator is not less than 70% by volume and not more than 80% by volume. A ratio of a porosity of the porous heat resistance layer with respect to the porosity of the separator is not less than 0.3 and not more than 0.6.

According to the aspect of the present invention, the porosity of the separator is not less than 70% by volume and not more than 80% by volume. When such a range of the porosity is satisfied, excellent ion permeability and electrolyte holding function can be exerted, and high battery performance (for example, high input/output characteristics) can be realized. Further, when the ratio of the porosity of the porous heat resistance layer with respect to porosity A of the separator satisfies the above range, the separator and the porous heat resistance layer in contact therewith can cooperatively work as a so-called buffer material against the foreign matter. That is, the separator having high porosity and the porous heat resistance layer having the porosity lower than that of the separator cooperatively and properly disperse and reduce a stress possibly applied to the foreign matter so as to prevent the foreign matter from penetrating through the separator and causing the internal short circuit. Therefore, according to a structure like this, a nonaqueous electrolyte secondary battery that can combine excellent battery performance and reliability (resistance against the foreign matter that can be contained in the battery) can be realized. Here, a "nonaqueous electrolyte secondary battery" in the specification means a battery that includes a nonaqueous electrolyte (typically, a nonaqueous electrolyte solution containing a support salt in a nonaqueous solvent).

According to the aspect of the present invention, the separator may be formed of at least one of a polyethylene resin and a polypropylene resin. A porous resin sheet formed of the polyethylene resin or polypropylene resin has a shut-down temperature of about 80° C. to 140° C. Therefore, since the shut-down temperature can be set sufficiently lower than the heat resistance temperature of the battery (typically, about not less than 200° C.), the shut-down function can be exerted at a proper timing. Therefore, a battery having higher reliability can be realized.

According to the aspect of the present invention, an average thickness of the separator may be larger than 0 μm and not more than 30 μm. Alternatively, the average thickness of the separator may be not less than 15 μm and not more than 30 μm. When the thickness of the separator is in the above range, the ion permeability becomes excellent and electric resistance can further be reduced. Therefore, a battery that is further excellent in battery performance and less likely to cause the internal short circuit (breakage of the separator) can be realized.

According to the aspect of the present invention, an average thickness of the porous heat resistance layer may be not less than 3 μm and not more than 15 μm. Alternatively, an average thickness of the porous heat resistance layer may be not less than 5 μm and not more than 15 μm. When the average thickness of the porous heat resistance layer is set to not less than 3 μm, the internal short circuit caused by foreign matter contamination in the battery can further be prevented from occurring. In addition, the thermal stability and mechanical strength of the porous heat resistance layer (shape stability) can be further improved. Further, when the average thickness of the porous heat resistance layer is set to not more than 15 μm, the ion permeability can be secured, and electric resistance can be reduced. Therefore, an effect of the aspect of the present invention can be exerted at a higher level.

According to the aspect of the present invention, the inorganic filler may contain alumina or alumina hydrate. Since these aluminum compounds have relatively high Mohs hardness, the mechanical strength of the porous heat resistance layer can further be improved. In addition, since aluminum has relatively small density among metals, weight reduction of the battery can be realized. According to the aspect of the present invention, an average particle size of the inorganic filler may be not more than 1 μm. Thus, a stress possibly applied to the foreign matter can properly be reduced, that is, an effect of the aspect of the present invention can be exerted at a higher level.

According to the aspect of the present invention, the porous heat resistance layer may be formed on a surface of the separator. When the foreign matter is contained in the battery (typically in the electrode body), problems such as a gap and buckling of the electrode body can occur due to the foreign matter. The stress possibly applied to the foreign matter can properly be reduced by integrating the separator and the porous heat resistance layer. Further, it is possible to properly prevent, from occurring, the internal short circuit that can occur during preparation of the electrode body or during use of the battery, and a problem such as a gap of the electrode body.

As described above, the nonaqueous electrolyte secondary battery (lithium ion secondary battery, for example) disclosed herein can properly maintain the battery performance and at the same time achieve high reliability against foreign matter contamination. For example, the nonaqueous electrolyte secondary battery has high input/output density and excellent endurance. Therefore, by taking advantage of characteristics like this, the nonaqueous electrolyte secondary battery may be used as a vehicle power source (driving power source), for example.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, with reference to drawings, preferable embodiments of the present invention will be described. In the attached drawings, the like members and regions that provide the same actions are denoted with like numerals. Further, a dimensional relationship (length, width, and thickness) in each of drawings does not reflect an actual dimensional relationship. Items that are necessary for carrying out the embodiment of the present invention other than items particularly referred to in the specification may be grasped as design matters of a person skilled in the art based on the related technology in the concerned field. The embodiment of the present invention may be carried out based on contents disclosed in the specification and common technical knowledge in the concerned field.

Although not particularly intended to limit, hereinafter, as a schematic structure of a nonaqueous electrolyte secondary battery according to one embodiment of the present invention, a nonaqueous electrolyte secondary battery in which a flatly wound electrode body and a non-aqueous electrolyte are housed in a flat cuboid (boxy) container will be described in detail.

Figure 2:
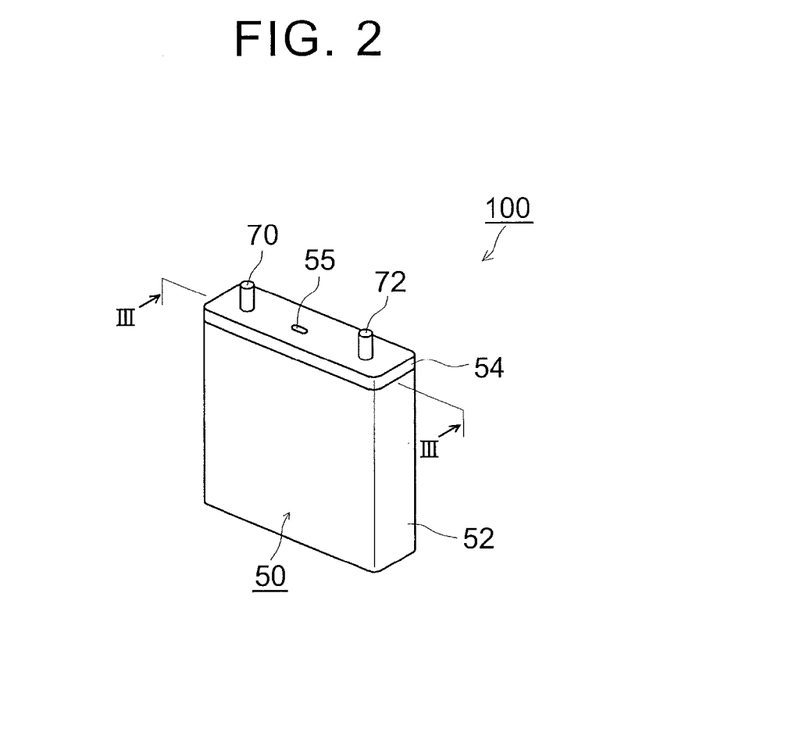
FIG. 2 is a perspective view that schematically shows an external shape of a nonaqueous electrolyte secondary battery according to one embodiment.
Figure 3:
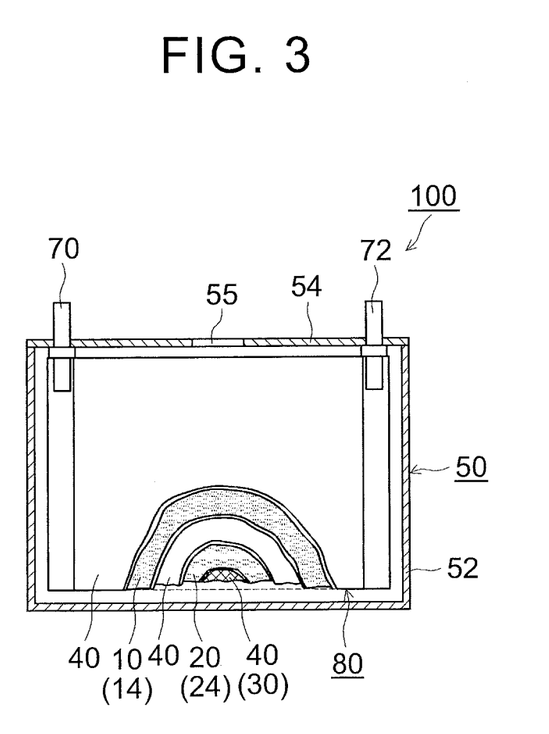
FIG. 3 is a cross-sectional diagram taken along a line of FIG. 2.
Figure 4:
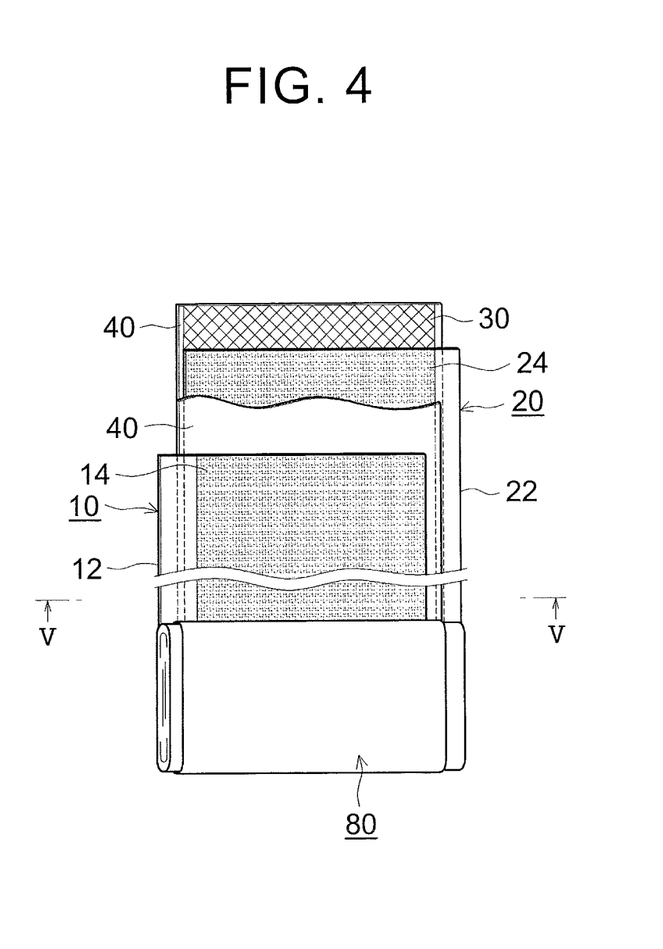
FIG. 4 is a schematic diagram that shows a structure of a wound electrode body of FIG. 3.
Figure 5:
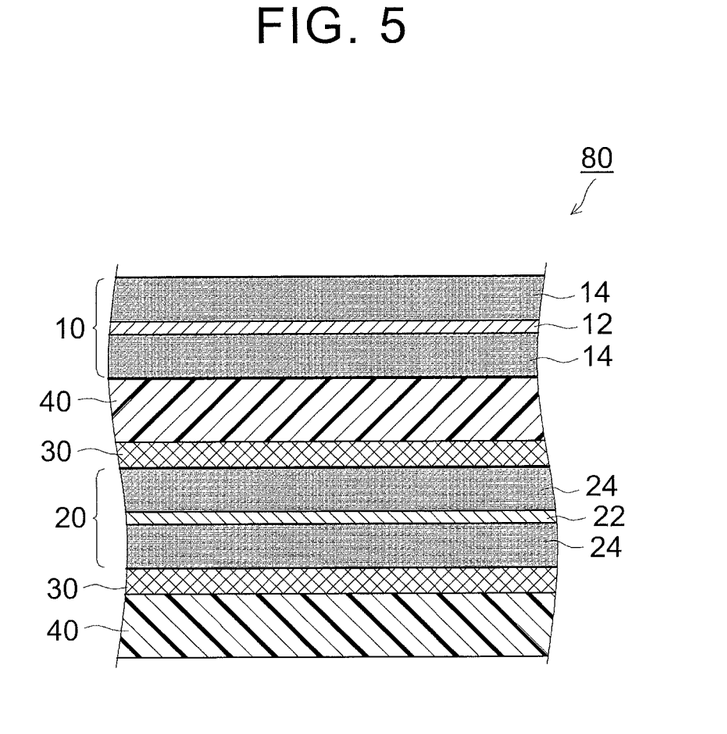
FIG. 5 is a cross-sectional diagram taken along a V-V line of FIG. 4.

A schematic structure of a nonaqueous electrolyte secondary battery according to one embodiment of the present invention is shown in FIG. 2 to FIG. 5. FIG. 2 is a perspective view that schematically shows an external shape of a nonaqueous electrolyte secondary battery 100. FIG. 3 is a schematic view that shows a cross-sectional structure along a III-III line of the nonaqueous electrolyte secondary battery 100 shown in FIG. 2. FIG. 4 is a schematic view that shows a structure of a wound electrode body 80 shown in FIG. 3. FIG. 5 is a schematic view that shows a cross-sectional structure along a V-V line of the wound electrode body 80 shown in FIG. 4.

As shown in FIG. 2 and FIG. 3, the nonaqueous electrolyte secondary battery 100 according to the present embodiment includes the wound electrode body 80 and a battery case (outer container) 50. The battery case 50 includes a flat cuboid (rectangular) battery case body 52 having an opening at an upper end, and a cap body 54 that closes the opening thereof. On a top surface of the battery case 50 (that is, the cap body 54), a positive electrode terminal 70 and a negative electrode terminal 72 are provided. The positive electrode terminal 70 is an external connection terminal for electrically connecting with the positive electrode of the wound electrode body 80. The negative electrode terminal 72 is a terminal for electrical connection with the negative electrode of the electrode body 80. The cap body 54 is provided with, in the same manner as the battery case of the nonaqueous electrolyte secondary battery of the related art, a safety valve 55 for discharging a gas generated inside the battery case 50 to the outside of the case 50. As shown in FIG. 3, inside the battery case 50, the electrode body (wound electrode body) 80 is housed together with the non-aqueous electrolyte (not shown). The wound electrode body 80 includes a long sheeted positive electrode (positive electrode sheet) 10, a long sheeted negative electrode (negative electrode sheet) 20, and two long sheeted separators (separator sheets) 40. The positive electrode sheet 10 and the negative electrode sheet 20 are flatly wound with the separator sheet 40 interposed therebetween. Further, on a surface of the separator sheet 40, a porous heat resistance layer 30 is disposed.

Hereinafter, the wound electrode body 80 will be described. As shown in FIG. 4 and FIG. 5, the wound electrode body 80 according to the present embodiment has a flat long sheet structure in a step preceding the assembly of the wound electrode body 80. The wound electrode body 80 like this is formed into a flat shape by stacking the positive electrode sheet 10, the separator sheet 40, the porous heat resistance layer 30, the negative electrode sheet 20, the porous heat resistance layer 30, and the separator sheet 40 in this order, winding them in a longitudinal direction, and further crushing these from a side surface direction to squash. In the flat wound electrode body 80 as described here, it is particularly necessary to prevent the displacement and buckling from occurring. In addition, since a surface pressure tends to be higher in a corner part than a straight line part, the embodiment of the present invention that can improve the resistance against problems caused by foreign matter contamination is preferably applied.

At each of both ends in a winding axis direction of the wound electrode body 80, a part in which an electrode active material layer is not formed of each of the positive electrode sheet 10 and the negative electrode sheet 20 protrudes outside from a winding core part. In such protruding parts on a positive electrode side and on a negative electrode side, a positive electrode current collector plate and a negative electrode current collector plate are disposed respectively and electrically connected with the positive electrode terminal 70 (FIG. 3) and the negative electrode terminal 72 (FIG. 3), respectively.

Hereinafter, the positive electrode sheet 10 will be described. As shown in FIG. 4 and FIG. 5, the positive electrode sheet 10 includes a longer positive electrode current collector 12 and a positive electrode active material layer 14 containing at least a positive electrode active material. The positive electrode active material layer 14 is formed on one side or on both sides (here, on both sides) of the current collector along a longitudinal direction. The positive electrode sheet 10 like this may be prepared by applying a pasty or slurry composition, which is obtained by dispersing the positive electrode active material and a material used as required in an appropriate solvent, to the longer positive electrode current collector 12 and by drying the composition. As the positive electrode current collector 12, a conductive member made of a metal (aluminum and nickel, for example) having excellent conductivity may be preferably used. Further, as the solvent, any of an aqueous solvent and an organic solvent can be used. N-methyl-2-pyrolidone (NMP) may be used, for example.

As the positive electrode active material, one or more kinds of various materials known to be used as the positive electrode active material of the nonaqueous electrolyte secondary battery can be used without particular restriction. As preferable examples, layer-system and spinel-system lithium composite metal oxides ($LiNiO_2$, $LiCoO_2$, $LiMn_2O_4$, and $LiFeO_2$) can be used. Among these, lithium nickel cobalt manganese composite oxide ($LiNi_{1/3}Co_{1/3}Mn_{1/3}O_2$, for example) can preferably be used because this composite oxide has excellent thermal stability and a theoretical energy density higher than other compounds. As described above, lithium nickel cobalt manganese composite oxide contains Li, Ni, Co and Mn as constituent elements and has a layered structure (typically, a layered rock salt structure belonging to a hexagonal system).

In the positive electrode active material layer 14 used here, in addition to the positive electrode active material, one or more kinds of materials used as constituents of the positive electrode active material layer in a general non-aqueous electrolyte secondary battery may be contained as required. As examples of such materials, a conductive material and a binder can be used. As the conductive material, carbon materials such as various kinds of carbon blacks (typically, acetylene black, Ketjen black), cokes, activated carbon, graphite, carbon fiber, and carbon nanotube, for example, can properly be used. As the binder, for example, polymer materials such as polyvinylidene fluoride (PVdF) and polyethylene oxide (PEO) can preferably be used.

A ratio of the positive electrode active material in the entire positive electrode active material layer 14 is properly set to about 60% by mass or more (typically, 60% by mass to 99% by mass) and is usually preferable to be about 70% by mass to 95% by mass. When the conductive material is used, a ratio of the conductive material in the entire positive electrode active material layer 14 may be about 2% by mass to 20% by mass, for example, and is usually preferable to be set to about 3% by mass to 10% by mass. When the binder is used, a ratio of the binder in the entire positive electrode active material layer 14 may be about 0.5% by mass to 10% by mass, for example, and is usually preferably set to about 1% by mass to 5% by mass.

A mass of the positive electrode active material layer 14 disposed per unit area of the positive electrode current collector 12 may be about 5 $mg/cm^2$ to 40 $mg/cm^2$ (typically, 10 $mg/cm^2$ to 20 $mg/cm^2$) per one side of the positive electrode current collector 12. Incidentally, in a structure where both sides of the positive electrode current collector 12 have the positive electrode active material layer 14 like in the present embodiment, masses of the positive electrode active material layer 14 disposed on both sides of the positive electrode current collector 12 are preferably set to about the same. Further, the density of the positive electrode active material layer 14 maybe, for example, about 1.5 $g/cm^3$ to 4 $g/cm^3$ (typically, 1.8 $g/cm^3$ to 3 $g/cm^3$). A thickness of the positive electrode active material layer 14 per one side of the positive electrode current collector 12 may be, for example, 40 μm or more (typically, 50 μm or more) and 100 μm or less (typically, 80 μm or less). The porosity of the positive electrode active material layer 14 may be typically lower than the porosity of the separator sheet 40 (70% by volume to 80% by volume) and may be the same as the porosity of the porous heat resistance layer 30 described below, for example. Specifically, the porosity may be 5% by volume to 40% by volume (preferably 20% by volume to 40% by volume), for example. When the properties of the positive electrode active material layer 14 are set in the above range, the resistance can be suppressed low while maintaining a desired capacity. Therefore, the output characteristics and the energy density of the nonaqueous electrolyte secondary battery can be combined at a high level. The thickness, density and porosity of the positive electrode active material layer 14 can be adjusted by applying a proper press process after drying the positive electrode active material slurry, for example.

In the present specification, the "porosity" can be obtained from a formula: $(1-W/\rho V) \times 100$ with a mass W (g), an apparent volume V ($cm^3$), and true density $\rho$ ($g/cm^3$), for example. The "apparent volume" can be calculated as a product of an area S ($cm^2$) in plan view and a thickness T (cm). The "area S in plan view" can be obtained by cutting out the separator in a square or rectangle with a punching machine or a cutter. The "thickness T" can be measured using a micrometer or a thickness meter (for example, rotary caliper), for example. The "true density p" can be measured using a densitometer such as general constant volume expansion method (gas-substituted picnometer method).

Hereinafter, the negative electrode sheet 20 will be described. As shown in FIG. 4 and FIG. 5, the negative electrode sheet 20 includes a long negative electrode current collector 22 and a negative electrode active material layer 24 that contains at least a negative electrode active material. The negative electrode active material layer 24 is formed on one side or both sides (here, both sides) of the current collector along a longitudinal direction. The negative electrode sheet 20 like this may be prepared in such a manner that a pasty or slurry composition, which is obtained by dispersing a negative electrode active material and a material used as required in a proper solvent is applied, to the long negative electrode current collector 22 and the composition is dried to form the negative electrode active material layer 24. As the negative electrode current collector 22, a conductive material made of metal having excellent conductivity (for example, copper, nickel) can preferably be used. As the solvent, any of an aqueous solvent and an organic solvent can be used. For example, water may be used.

As the negative electrode active material, one or more kinds of various materials that are known to be used as a negative electrode active material of the nonaqueous electrolyte secondary battery can be used without particular restriction. Preferable examples include graphite, hardly graphitizable carbon (hard carbon), easily graphitizable carbon (soft carbon), carbon nanotubes, and carbon materials that contain a graphite structure (layered structure) in at least a portion of a material having combined structures of these. Among these, natural graphite (black lead) or artificial graphite can preferably be used.

The negative electrode active material layer 24 used here may contain, in addition to the negative electrode active material, one or more kinds of materials that can be used as constituents of the negative electrode active material layer in the general nonaqueous electrolyte secondary battery, as required. As examples of such materials, binders and various kinds of additives can be used. As the binder, for example, polymer materials such as styrene butadiene rubber (SBR) and polyvinylidene fluoride (PVdF) can preferably be used. Other than the above, various kinds of additives such as a thickener, a dispersant and a conductive agent can be properly used. For example, as the thickener, carboxyl methylcellulose (CMC) and methyl cellulose (MC) can preferably be used.

A ratio of the negative electrode active material in the entire negative electrode active material layer 24 is properly set to about 50% by mass or more and usually preferably set to 90% by mass to 99% by mass (95% by mass to 99% by mass, for example). When the binder is used, a ratio of the binder in the entire negative electrode active material layer 24 is properly set to about 1% by mass to 10% by mass, for example, and usually preferably set to about 1% by mass to 5% by mass.

A mass of the negative electrode active material layer 24 disposed on per unit area of the negative electrode current collector 22 may be set to about 5 $mg/cm^2$ to 20 $mg/cm^2$ (typically 7 $mg/cm^2$ to 15 $mg/cm^2$) per one side of the negative electrode current collector 22. In a structure that has the negative electrode active material layer 24 on both sides of the negative electrode current collector 22 like this embodiment, masses of the negative electrode active material layers 24 disposed on both sides of the negative electrode current collector 22 are preferably set to substantially the same. In addition, the density of the negative electrode active material layer 24 may be set to about 0.5 $g/cm^3$ to 2 $g/cm^3$ (typically, 1 $g/cm^3$ to 1.5 $g/cm^3$), for example. A thickness of the negative electrode active material layer 24 per one side of the negative electrode current collector 22 may be set to 40 μm or more (typically, 50 μm or more) and 100 μm or less (typically, 80 μm or less). The void fraction (porosity) of the negative electrode active material layer 24 is typically smaller than the porosity of the separator (70% by volume to 80% by volume), may be the same as the porosity of a heat resistance layer described below, for example, and may be set to about 5% by volume to 50% by volume (preferably, 35% by volume to 50% by volume). When the properties of the negative electrode active material layer are set in the above range, an interface with a non-aqueous electrolyte can properly be maintained, and the endurance (cycle characteristics) and output characteristics can be combined at a high level. Thickness, density, and porosity of the negative electrode active material layer 24 can be adjusted by applying a proper press process in the same manner as the positive electrode active material layer 14 described above.

Hereinafter, the separator sheet 40 will be described. As a material that forms the separator sheet 40, any material that can insulate the positive electrode active material layer 14 from the negative electrode active material layer 24 and has a holding function of the non-aqueous electrolyte and the shut-down function can be used. Preferable examples thereof include porous resin sheets (films) made of resins such as polyethylene (PE), polypropylene (PP), polyester, cellulose, and polyamide. Among these, polyolefin porous resin sheets (for example, PE or PP) have the shut-down temperatures of 80° C. to 140° C. (typically, 110° C. to 140° C., for example 120° C. to 135° C.). Since the shut-down temperature thereof is sufficiently lower than the heat resistance temperature of the battery (typically, about 200° C. or more), the shut-down function can be provided at a proper timing.

As the porous resin sheet, for example, a uniaxially-stretched resin or a biaxially-stretched resin may preferably be used. Among these, a porous resin sheet obtained by uniaxially stretching in a longitudinal direction has, while having appropriate strength, little thermal contraction in a width direction. As a result, a shape change such as curl is less likely to occur. Therefore, when the sheet like this is used as the separator sheet 40, in the wound electrode body 80 having a form as shown in FIG. 4, thermal contraction in a longitudinal direction can properly be prevented. The porous resin sheet can contain additives such as various kinds of plasticizers and antioxidants, as required.

The porosity of the separator sheet 40 disclosed herein is 70% by volume or more and 80% by volume or less. When the porosity of the separator is excessively small, in the case where a foreign matter (typically, a metallic foreign matter) is present on an electrode surface, for example, the foreign matter may break the separator and cause internal short circuit. When the porosity of the separator sheet 40 is set to 70% by volume or more, even when a very small foreign matter having a diameter $\phi$ of about 30 to 50 µm is present inside a battery (typically, inside an electrode body), for example, the separator bends to allow proper reduction in a stress possibly applied to the foreign matter, and the separator can properly be prevented from being broken. Further, by increasing an amount of the non-aqueous electrolyte that can be held by the separator, the battery performance (ion permeability and input/output characteristics) can be improved. On the other hand, when the porosity of the separator is excessively large, the mechanical strength becomes insufficient, and the thermal contraction may be excessive. When the porosity of the separator sheet 40 is set to 80% by volume or less, excellent mechanical strength can be maintained, and the insulation between the positive electrode and negative electrode can properly be maintained. The porosity of the separator sheet 40 can be adjusted by kinds of constituent materials and strength during stretching, for example.

A thickness of the separator sheet 40 is not particularly restricted, but is usually 10 µm or more (typically, 15 µm or more, 17 µm or more, for example), and preferably 40 µm or less (typically 30 µm or less, 25 µm or less, for example). When the thickness of the separator sheet 40 is in the above range, the ion permeability of the separator becomes higher, and even when the foreign matter enters the battery, the internal short circuit (breaking of separator film) is then further less likely to occur. The thickness of the separator can be obtained by other means than measuring with the micrometer or thickness meter described above, and analyzing a cross-sectional image obtained by observing with a general scanning electron microscope, for example.

The air permeability (Gurley permeability) of the separator sheet 40 is, although not particularly restricted, usually preferable to be 50 sec/100 mL or more (typically, 100 sec/100 mL or more, 200 sec/100 mL or more, for example) and 1000 sec/100 mL or less (typically, 600 sec/100 mL or less). Such air permeability defines an average pore diameter in a pseudo manner, and when the air permeability is excessively small, the ion permeability may decrease and result in decreasing tendency of the input/output characteristics. When the air permeability is excessively large and the porous heat resistance layer described below is formed on the separator, for example, the inorganic filler contained in the porous heat resistance layer excessively intrudes in pores of the separator and result in decreasing tendencies of the ion permeability and the input/output characteristics. Here, the "air permeability" means air permeability resistance (Gurley) and can be measured according to a method defined by JIS P8117 (2009).

The separator sheet 40 may have a single layer structure such as shown in FIG. 5, for example, or a structure where two or more kinds of porous resin sheets that are different in materials and performance (thickness, porosity) are laminated. As an example of multi-layered structure, a separator sheet having a three-layered structure where a polypropylene (PP) layer is laminated on both sides of a polyethylene (PE) layer may be preferably adopted. Further, when a structure where two or more kinds of porous resin sheets having different porosities are laminated is used, in the preferable range of the porosity, the porous resin sheets may be laminated such that the porosity on a side close to the porous heat resistance layer 30 may be smaller, for example. According to such an aspect, the effect of the present invention can be provided at a higher level. Further, for two separator sheets 40 provided to the wound electrode body 80, separator sheets different in material and performance from each other may be adopted.

Figure 1:
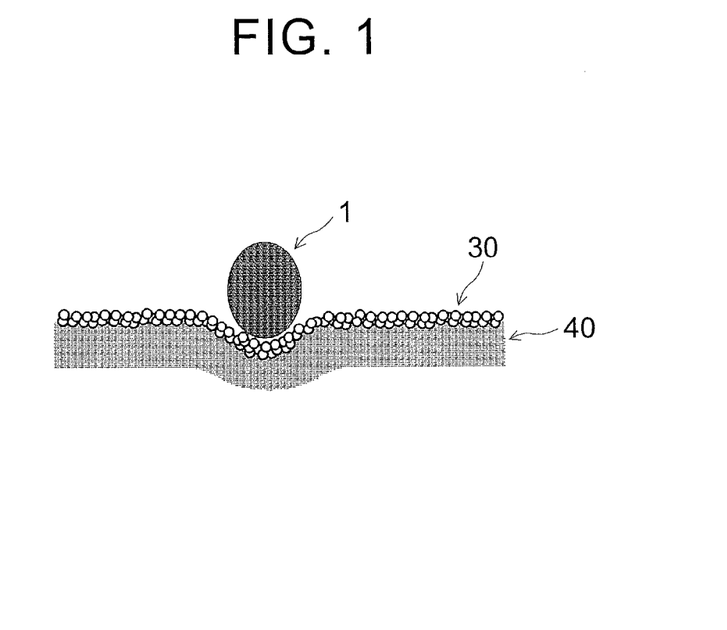
FIG. 1 is a schematic diagram that shows a function and an effect in foreign matter contamination.

Hereinafter, the porous heat resistance layer 30 will be described. The nonaqueous electrolyte secondary battery disclosed herein is provided with the porous heat resistance layer that includes an inorganic filler between the positive electrode and the separator and/or between the negative electrode and the separator. The porous heat resistance layer 30 may have such a performance that even when the inside of the battery is heated to a high temperature (150° C. or more, for example, typically, 200° C. or more) due to internal short circuit, for example, the porous heat resistance layer 30 is not softened or molten and can maintain a shape thereof (a slight deformation is permitted). According to the embodiment described here, the porous heat resistance layer 30 is provided between the negative electrode sheet 20 and the separator sheet 40 (in other words, a position that faces the negative electrode active material layer 24 of the negative electrode sheet 20). For example, when a battery is produced, a metallic foreign matter such as copper or iron may enter the battery from the outside (constituent members of a production apparatus, for example). The entering metallic foreign matter is ionized (by forming $Cu^{2+}$, $Fe^{2+}$, for example) when a dissolution potential is exceeded due to charging of a battery and eluted into the non-aqueous electrolyte. As shown in FIG. 1, when the metallic ion is reduced on a negative electrode and locally precipitates on the negative electrode, the metallic ion may penetrate through the separator to cause the internal short circuit. According to the embodiment shown in FIG. 5, even when a metallic foreign matter 1 precipitated on a surface of the negative electrode 20 like this, since a stress possibly applied to the metallic foreign matter can properly be dispersed and reduced, the internal short circuit can properly be prevented from occurring.

The porous heat resistance layer 30 is typically formed on a surface of the separator sheet 40, the positive electrode sheet 10, or the negative electrode sheet 20. According to the embodiment described here, the porous heat resistance layer 30 is formed on a surface on one side of the separator sheet 40. Even when a foreign matter is contained in the battery (typically, inside of the electrode body), for example, when the separator sheet and the porous heat resistance layer are integrated, a stress possibly applied to the foreign matter can properly be reduced. Thus, the internal short circuit that can occur during preparation of the electrode body or during use of the battery, and problems such as displacement of the electrode body and buckling can properly be prevented from occurring. The porous heat resistance layer 30 like this contains the inorganic filler excellent in the heat resistance and endurance, and can be prepared by applying a pasty or slurry composition, which is obtained by dispersing the inorganic filler and a material used as required in a proper solvent, to a surface of the separator sheet 40, and by drying the composition. As the solvent, any aqueous solvent or organic solvent can be used. For example, water can be used.

Although the porosity of the porous heat resistance layer 30 is not particularly restricted, it can be 20% by volume or more and 50% by volume or less, for example. When the porosity of the porous heat resistance layer is excessively large, the mechanical strength may be insufficient. Further, when the porosity is excessively small, the ion permeability may decrease and result in an increase in the resistance and in a decrease in the input/output characteristics. When the porosity is set in the above range, a ratio (B/A) of the porosities described below can properly be realized. Incidentally, the porosity of the porous heat resistance layer 30 can be adjusted according to constituent materials, a blending ratio thereof, a coating method, and a drying method.

According to the technology disclosed herein, a ratio (B/A) of the porosity B of the porous heat resistance layer with respect to the porosity A of the separator is 0.3 or more and 0.6 or less (preferably 0.3 or more and 0.4 or less). When the above range is satisfied, the separator and the porous heat resistance layer adjacent thereto can cooperatively work like a buffer material against the foreign matter in the battery. That is, the separator sheet 40 having high porosity and the porous heat resistance layer 30 having the porosity lower than that of the separator sheet can cooperatively disperse and reduce, in a stepwise manner, a stress possibly applied to the foreign matter in the battery. Therefore, the foreign matter is properly prevented from penetrating through the separator sheet 40.

Although a thickness of the porous heat resistance layer 30 is not particularly restricted, it is usually 1 μm or more, and preferably 2 μm or more, for example (typically, 3 μm or more, preferably 5 μm or more.) When the thickness of the porous heat resistance layer 30 is set to 1 μm or more, the internal short circuit can be preferably prevented from occurring, and a high short circuit prevention effect can be exerted. Further, when the thickness of the porous heat resistance layer 30 is set to 2 μm or more, when the separator, is shut-down (molten), the melt can properly be prevented from entering a pore in the battery. Although the upper limit of the thickness is not particularly restricted, it is usually 20 μm or less and preferably 15 μm or less (typically, 10 μm or less), for example. When the above range is satisfied, excellent battery characteristics and reliability (resistance against the foreign matter contained in the battery) can be combined at a higher level, and the effect of the embodiment of the present invention can be exerted at a further higher level.

The porous heat resistance layer 30 disclosed herein includes at least particles of an inorganic compound (inorganic filler). Although the inorganic filler is not particularly restricted, for example, one or more kinds can be used among aluminum compounds such as alumina (aluminum oxide: $Al_2O_3$), and alumina hydrate (boehmite ($Al_2O_3 \cdot H_2O$), for example); inorganic oxides such as magnesia (magnesium oxide: MgO), silica (silicon oxide: $SiO_2$), titania (titanium oxide: $TiO_2$), zirconia (zirconium dioxide: $ZrO_2$), and barium titanate ($BaTiO_3$); inorganic nitrides such as silicon nitride ($Si_3N_4$) and alumina nitride (AlN); inorganic carbides such as silicon carbide (SiC); and element-based materials such as carbon (C), silicon (Si), aluminum (Al), and iron (Fe). Among these, aluminum compounds, magnesia, silica, titania and zirconia can preferably be used, and alumina, boehmite and magnesia can be particularly preferably adopted. These compounds have a high melting point and are excellent in the heat resistance. Further, these compounds have relatively high Mohs hardness and are excellent also in the endurance (mechanical strength). Further, since these are relatively cheap, raw material cost can be saved.

A form of the inorganic filler is not particularly restricted and can be particulate, fiber, plate (flake form), for example. Further, although an average particle size of the inorganic filler is not particularly restricted, in consideration of the dispersibility, it is typically 5 μm or less, 2 μm or less, for example, preferably 1 μm or less. When the average particle size of the inorganic filler is set to 1 μm or less, the effect of the present invention can be provided at a higher level. Although the lower limit of the average particle size is not particularly restricted, in consideration of handleability, it is usually 0.01 μm or more, typically 0.1 μm or more, and may be 0.2 μm or more, for example. Alternatively, a flake form inorganic filler having an average particle size of about 0.5 μm to 5 μm may be used. The "average particle size" here means, in a particle size distribution based on volume measured by particle size distribution measurement based on a general laser diffraction and light scattering method, a particle diameter ($D_{50}$ particle size, also called as a median diameter) corresponding to a cumulative volume of 50% from fine particle side. A particle size of the inorganic filler can be adjusted according to a method such as pulverization or sieving, for example.

Although a specific surface area of the inorganic filler is not particularly restricted, about 1 $m^2/g$ to 100 $m^2/g$ (1.5 $m^2/g$ to 50 $m^2/g$, for example, 5 $m^2/g$ to 20 $m^2/g$, typically) is preferable. As the "specific surface area" here, a BET specific surface area is adopted.

The porous heat resistance layer 30 may contain, in addition to the inorganic filler described above, one kind or two or more kinds of materials that can be used as constituent components of the porous heat resistance layer in the general nonaqueous electrolyte secondary battery. As examples of such materials, binders and various kinds of additives can be used. As the binders, other than the binder that can be contained in a forming composition of the positive electrode active material layer or negative electrode active material layer, one or more kinds can be selected and used from, for example, rubbers containing acrylonitrile as a copolymerizing component such as acrylonitrile-butadiene copolymer rubber (NBR), acrylonitrile-isoprene copolymer rubber (NIR), and acrylonitrile-butadiene-isoprene copolymer rubber (NBIR); acryl-based polymers containing acrylic acid, methacrylic acid, acrylic acid ester or methacrylic acid ester as a main copolymerizing component; polyolefin-based polymer such as polyethylene (PE); fluorinated polymers such as polytetrafluoroethylene (PTFE); and cellulose-based polymers such as carboxymethyl cellulose (CMC) and methyl cellulose (MC). Among these, acryl-based polymers with an acrylic resin as a base have a strong binding force and also are electrochemically stable and are thus preferable. Other than the above, various kinds of additives such as a thickener and a dispersant can properly be used.

A ratio of the inorganic filler contained in the entire porous heat resistance layer 30 is properly set to about 50% by mass or more, usually preferably set to 85% by mass to 99.8% by mass (90% by mass to 99% by mass, for example). When the binder is used, a ratio of the binder in the entire porous heat resistance layer 30 may be set to about 1% by mass to 10% by mass, usually preferably set to about 1% by mass to 5% by mass.

In the separator sheet 40 shown in FIG. 5, the porous heat resistance layer 30 is formed on a surface on a side that faces the negative electrode sheet 20. However, the separator sheet 40 is not restricted to such a configuration, and the porous heat resistance layer 30 may be formed on a surface on a side that faces the positive electrode sheet 10. According to such a configuration, for example even when the metallic foreign matter entering the battery from the outside when the battery is produced is ionized due to charging of the battery and locally precipitates on a surface of the positive electrode 10 (specifically, positive electrode active material layer 14), the internal short circuit caused by the metallic foreign matter can properly be prevented from occurring. Further, the porous heat resistance layer 30 may be formed not only on one surface of the separator sheet 40 but also on both surfaces thereof. In such a case, between a surface on a side that faces the positive electrode sheet 10 and a surface on a side that faces the negative electrode sheet 20, properties of the porous heat resistance layers 30 may be the same. For example, a kind and a ratio and porosity of the contained inorganic filler may be different.

Hereinafter, the battery case 50 will be described. As the material of the battery case 50, for example, metal materials such as aluminum and steel; resin materials such as a polyphenylene sulfide resin and a polyimide resin can be used. Among these, from the viewpoint of improving the heat dissipation properties and energy density, relatively lightweight metals (such as aluminum and aluminum alloys) can preferably be adopted. Further, a shape of the case (an external shape of the container) can be, for example, a circle (cylinder, coin, and button), a hexahedron (cuboid and cube), a bag-shape and shapes obtained by processing and modifying these.

Hereinafter, the non-aqueous electrolyte will be described. As the non-aqueous electrolyte, a solution in which a support salt is dissolved or dispersed in a nonaqueous solvent can preferably be adopted. The support salt may be a lithium salt, a sodium salt or a magnesium salt, for example, and may be a lithium salt in the lithium ion secondary battery. Alternatively, the non-aqueous electrolyte may be a solid (typically, so-called gel) non-aqueous electrolyte obtained by adding a polymer in a liquid non-aqueous electrolyte. As the support salt, the same as that of the general nonaqueous electrolyte secondary battery can appropriately be selected and adopted, and, lithium salts such as $LiPF_6$, $LiBF_4$, $LiClO_4$, $LiAsF_6$, $Li(CF_3SO_2)_2N$, and $LiCF_3SO_3$ may be used. The support salts like these may be used alone or in a combination of two or more kinds thereof. As a particularly preferable support salt, $LiPF_6$ can be used. Further, the non-aqueous electrolyte is preferably prepared such that a concentration of the support salt may be in the range of 0.7 mol/L to 1.3 mol/L.

As the nonaqueous solvent, organic solvents such as various kinds of carbonates, ethers, esters, nitriles, sulfones, and lactones which are used as the nonaqueous electrolyte solution in the general nonaqueous electrolyte secondary battery can be used without limitation. Specific examples thereof include ethylene carbonate (EC), propylene carbonate (PC), diethyl carbonate (DEC), dimethyl carbonate (DMC), and ethyl methyl carbonate (EMC). The nonaqueous solvents like these can be used alone or in an appropriate combination of two or more kinds thereof. Further, in the nonaqueous electrolyte, as long as an object of the present invention is not largely damaged, various kinds of additives can properly be added. The additives can be used for one or more objects of improving output performance of the battery, improving storage stability (prevention of capacity decrease during storage), improving cycle characteristics and improving initial charge/discharge efficiency. Preferable examples of the additives include fluorophosphates (typically, difluorophosphate, for example, lithium difluorophosphate), lithium bis oxalato borate (LiBOB), vinylene carbonate (VC), and fluoroethylene carbonate (FEC).

The nonaqueous electrolyte secondary battery disclosed herein can be used in various applications and is characterized in that high battery performance and reliability (resistance against in-battery foreign matter) are combined. Therefore, the nonaqueous electrolyte secondary battery can preferably be used in applications where high energy density and input/output density are required or in applications where high reliability is required. An example of such applications may be a driving source (driving power source) for a motor installed in a vehicle. A kind of the vehicle is not particularly restricted, but examples include a plug-in hybrid vehicle (PHV), a hybrid vehicle (HV), an electric vehicle (EV), an electric truck, a motorized bicycle, a motor-assisted bicycle, an electric wheel chair, an electric train. Such nonaqueous electrolyte secondary batteries may be used in a form of pack battery where a plurality of the batteries are connected in series and/or in parallel.

Hereinafter, as a specific embodiment, whether there is a difference in reliability (resistance against foreign matter contamination) between batteries corresponding to structures disclosed here or not was studied. It is not intended to restrict the present invention to specific examples like this.

Hereinafter, Study (Study I) relating to the porosity of the separator will be described with Example 1 to Example 9. First, preparation of a positive electrode will be described. By mixing a $Li[Ni_{0.33}Co_{0.33}Mn_{0.33}]O_2$ powder (LNCM) as the positive electrode active material, polyvinylidene fluoride (PVdF) as the binder, and acetylene black (AB) as the conductive agent with N-methyl pyrrolidone (NMP) such that a mass ratio of these materials may be LNCM:PVdF:AB=94:3:3 and a solid content concentration may be about 60% by mass, a slurry composition for forming the positive electrode active material layer (positive electrode active material slurry) was prepared. The slurry was coated on one side of a long aluminum foil (positive electrode current collector) having a thickness of about 15 μm in a belt shape such that a basis weight may be 10 mg/cm$^2$ (solid content base) by a roller coat method and dried (drying temperature: 120° C., for 1 minute), and a positive electrode active material layer having a thickness of about 65 μM was thereby formed. This was rolled with a roll press and a positive electrode sheet (total thickness: 80 μm) was obtained.

Subsequently, preparation of the negative electrode will be described. By mixing natural graphite powder (C) as the negative electrode active material, styrene butadiene rubber (SBR) as the binder, and carboxymethyl cellulose (CMC) as the thickener with ion exchange water such that a mass ratio of these materials may be C:SBR:CMC=98:1:1 and a solid content concentration may be about 45% by mass, a slurry composition for forming the negative electrode active material layer (negative electrode active material slurry) was prepared. The slurry was coated on one side of a long copper foil (negative electrode current collector) having a thickness of about 10 μm in a belt shape such that a basis weight may be 7 mg/cm$^2$ (solid content base) by a roller coat method and dried (drying temperature: 120° C., 1 minute), and a negative electrode active material layer having a thickness of about 80 μm was formed. This was rolled by a roller press and a negative electrode sheet (total thickness: 90 μm) was obtained.

Subsequently, preparation of the electrode body will be described. To each of uncoated parts of the above-obtained positive electrode sheet and negative electrode sheet, a lead (terminal) with a seal which is made of a metal of the same kind as the current collector was attached. Then the positive electrode sheet and the negative electrode sheet are disposed to face each other through the separator sheet and an electrode body was prepared. As the separator, porous sheets having a single layer structure of polyethylene (PE) and properties (thickness, porosity) shown in Example 1 to Example 9 in Table 1 were used. These porous sheets each have a thickness of about 25 μm and a shut-down temperature (softening temperature of PE) of 128° C. Each of the electrode bodies was housed in a laminate film (battery case) and a non-aqueous electrolyte (here nonaqueous electrolyte solution) was poured from an opening. As the nonaqueous electrolyte solution, a nonaqueous electrolyte solution obtained by dissolving $LiPF_6$ as the support salt in a concentration of 1 mol/L in a mixed solvent containing ethylene carbonate (EC), dimethyl carbonate (DMC) and methyl ethyl carbonate (EMC) at a volume ratio of EC:DMC:EMC=3:3:4 was used. Thereafter, while vacuuming, by thermally welding the laminate film and a sealing part of the lead to hermetically seal the opening, nonaqueous electrolyte secondary batteries according to Example 1 to Example 9 were formed. The nonaqueous electrolyte secondary batteries according to Example 1 to Example 9 are different only in the porosity of the separator from each other.

TABLE 1

| | Separator | | |
|---|---|---|---|
| | Thickness (μm) | Porosity A (% by volume) | Diameter φ of foreign matter (μm) |
| Example 1 | 25 | 50 | 125 |
| Example 2 | | 55 | 115 |
| Example 3 | | 60 | 100 |
| Example 4 | | 65 | 95 |
| Example 5 | | 70 | 65 |
| Example 6 | | 75 | 60 |
| Example 7 | | 80 | 60 |
| Example 8 | | 85 | 75 |
| Example 9 | | 90 | 85 |

Next, a foreign matter short circuit test will be described. With the batteries prepared above according to Example 1 to Example 9, the foreign matter short circuit test was conducted. Specifically, the prepared nonaqueous electrolyte secondary battery was first sandwiched with a SUS (Steel Use Stainless) restraining plate and a clip, and pressure (weight) of about 0.1 MPa was loaded on the battery. Then, at a charging rate of ⅕C, charge was conducted up to 4.2 V. Further under constant voltage, charge was conducted to a charging rate of 1/10 of an initial current value. Next, the battery after charge was disassembled in a dry atmosphere, an electrode body was taken out of the battery case. Inside of the electrode body and on a surface of the negative electrode, a small iron piece as the metallic foreign matter was inserted, and a nonaqueous electrolyte secondary battery was formed with such electrode body in the same manner as the above. Then, after the nonaqueous electrolyte secondary battery was again sandwiched with the restraining plate and the clip, pressure was loaded, and a battery voltage was measured. When the battery voltage decreased by 1 V or more (that is, when decreased to 3.2 V or less), by determining that the internal short circuit occurred, the test was stopped. Incidentally, the metallic foreign matter (iron) inserted in the electrode body had an initial diameter φ of 140 μm and a thickness of 10 μm. When the internal short circuit was not observed, the diameter φ of the foreign matter was sequentially reduced, and the test was repeated until the internal short circuit occurred. The diameter φ of the foreign matter when the internal short circuit occurred was shown in a column of "Diameter φ of foreign matter" in Table 1 and in FIG. 6.

Figure 6:
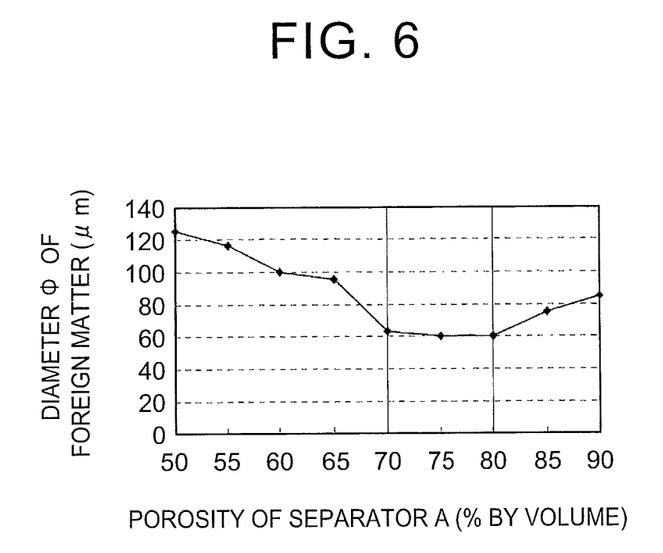
FIG. 6 is a graph that shows a relationship between the porosity of a separator and a diameter of a foreign matter.

As shown in Table 1 and FIG. 6, it was found that when the porosity of the separator is set to 70% by volume to 80% by volume, even when a fine (or sharp-edged) foreign matter having the diameter φ of 70 μm or less, for example, is contained in the battery (typically, on a surface of the electrode active material), a stress applied to the foreign matter can properly be dispersed and reduced. From this, it was shown that when the porosity of the separator is set to 70% by volume to 80% by volume, a battery having high reliability (resistance against foreign matter contamination) can be realized.

Hereinafter, Study (Study II) relating to a ratio (B/A) of the porosity B will be described with Example 10 to Example 19. First, preparation of a separator with the porous heat resistance layer will be described. First, a heat resistance layer forming slurry for forming the porous heat resistance layer was prepared. Specifically, by mixing alumina (average particle size: 1 μm, BET specific surface area: 18 $m^2$/g) as the inorganic filler, styrene butadiene rubber (SBR) as the binder, and carboxymethylcellulose (CMC) as the thickener with ion exchange water such that a weight ratio of these materials was alumina:SBR:CMC=97:2:1, a slurry composition for forming a heat resistance layer (a heat resistance layer forming slurry) was prepared. When such a slurry was prepared, using an ultrasonic disperser (manufactured by M Technique Co., Ltd., Clair Mix), mixing and kneading as pre-dispersion was conducted under the condition of 15,000 rpm for 5 minutes, and mixing and kneading as true dispersion was conducted under the condition of 20,000 rpm and for 15 minutes.

Next, on one side of the separator sheet according to Example 5 (that is, a separator sheet having an average thickness of 25 μm and the porosity of 70% by volume), according to a general gravure coating method, the above-prepared heat resistance layer-forming slurry was coated. In the coating, a gravure roll having the number of gravure lines: #100 lines/inch, and an ink retaining amount: 19.5 ml/$cm^2$ was used, and the coating condition was set to the coating speed of 3 m/minute, gravure roll speed of 3.8 m/minute, and gravure speed/coating speed ratio of 1.27. The separator after coating was dried (drying temperature: 120° C., for 1 minute). On one side of the separator sheet, a porous heat resistance layer having an average thickness of about 5 μm and the porosity of 7% by volume was formed, and a separator sheet (Example 10) was thereby prepared. In the same manner, separator sheets (Example 11 to Example 19) provided with the porous heat resistance layer having the porosity shown in Example 11 to Example 19 of Table 2 were prepared by adjusting the viscosity and coating amount of the slurry.

Next, preparation of the electrode body will be described. Nonaqueous electrolyte secondary batteries (Example 10 to Example 19) were prepared in the same manner as the Example 1 to Example 9 except that the separator was disposed such that the porous heat resistance layer and the negative electrode active material layer faced each other (that is, in an order of the negative electrode, the porous heat resistance layer, the separator, and the positive electrode), and the foreign matter short circuit test was conducted. The diameter φ of a foreign matter when the internal short circuit occurred is shown in a column of "Diameter φ of foreign matter" of Table 2 and FIG. 7.

TABLE 2

| | Separator | | Porous heat resistance layer | | | | Diameter φ of foreign matter (μm) |
|---|---|---|---|---|---|---|---|
| | Thickness (μm) | Porosity A (% by volume) | Thickness (μm) | Porosity B (% by volume) | Particle size of filler | B/A | |
| Example 10 | 25 | 70 | 5 | 7 | 1.0 | 0.1 | 78 |
| Example 11 | | | | 14 | | 0.2 | 65 |
| Example 12 | | | | 21 | | 0.3 | 31 |
| Example 13 | | | | 28 | | 0.4 | 30 |
| Example 14 | | | | 31.5 | | 0.45 | 32 |
| Example 15 | | | | 35 | | 0.5 | 32 |
| Example 16 | | | | 38.5 | | 0.55 | 33 |
| Example 17 | | | | 42 | | 0.6 | 33 |
| Example 18 | | | | 45.5 | | 0.65 | 50 |
| Example 19 | | | | 49 | | 0.7 | 60 |

Figure 7:
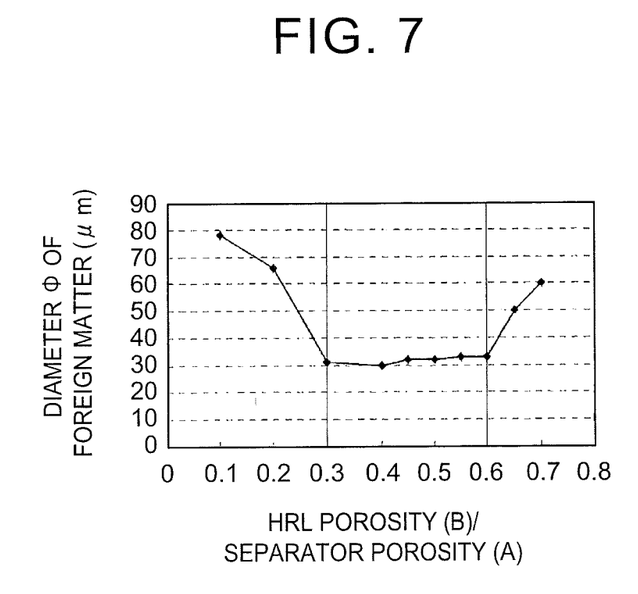
FIG. 7 is a graph that shows a relationship between a ratio (B/A) of porosities and a diameter of a foreign matter.

As shown in Table 2 and FIG. 7, it was found that when the B/A was set to 0.3 to 0.6 (particularly preferably 0.3 to 0.4), even when a fine metallic foreign matter having the diameter φ of 50 μm or less (about 30 μm to 50 μm, for example), for example, was contained in a battery (typically, on a surface of the electrode active material layer), a stress applied on the foreign matter can properly be dispersed and reduced. From this, it was shown that when the ratio (B/A) of the porosity B of the porous heat resistance layer with respect to the porosity A of the separator is set to 0.3 to 0.6, a battery having high reliability (resistance against foreign matter contamination) can be realized.

Figure 8:
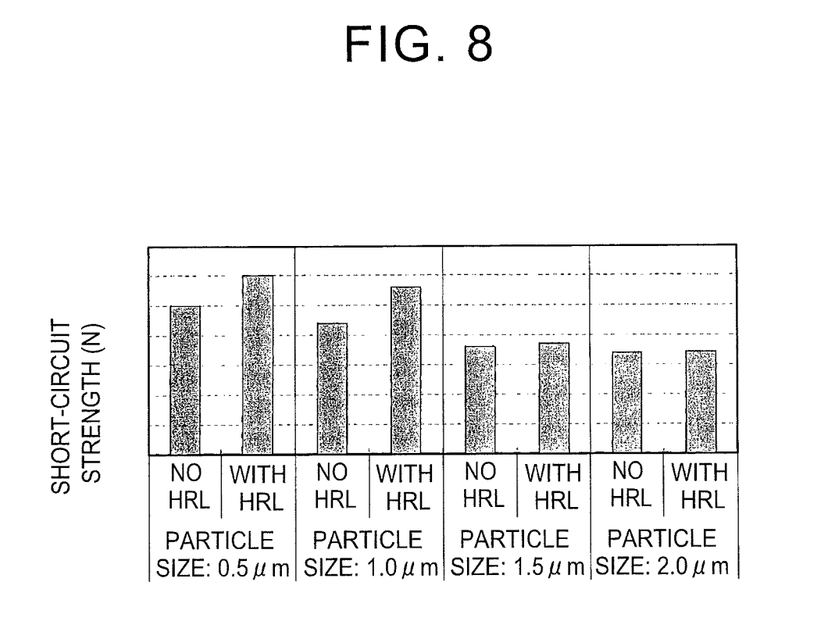
FIG. 8 is a graph that shows a relationship between an average particle diameter of an inorganic filler and short circuit strength.

Hereinafter, Study (Study III) relating to an average particle size of the inorganic filler will be described of Example 20 to Example 27. Nonaqueous electrolyte secondary batteries (Example 21, Example 23, Example 25, and Example 27) were prepared in the same manner as Example 10 to Example 19 except that, in the Study II: the inorganic filler having average particle sizes shown in Table 3 were used when the separator with the porous heat resistance layer was prepared; and a metallic foreign matter (a small piece of iron having the diameter φ of 100 μm and a thickness of 10 μm) was disposed in advance in the electrode body and on a surface of the negative electrode. Further, nonaqueous electrolyte secondary batteries (Example 20, Example 22, Example 24, and Example 26) that correspond to Example 21, Example 23, Example 25, and Example 27 and are not provided with the porous heat resistance layer were prepared according to the Study I. Then, the foreign matter short circuit test was conducted for the nonaqueous electrolyte secondary batteries according to Example 20 to Example 27, and results thereof were compared. Specifically, after a voltmeter is connected with terminals of the positive electrode and negative electrode of the prepared battery, the battery was sandwiched by two restraining plates, and a press machine was used to apply gradually increased pressure (load). By recording a loaded weight and a voltage change between the positive electrode and negative electrode, a weight when conductivity was formed between the positive electrode and negative electrode was obtained as "short circuit strength". Results are shown in FIG. 8. Incidentally, "no HRL" in FIG. 8 shows that a porous heat resistance layer is not provided inside the battery, and "with HRL" shows that the porous heat resistance layer is provided in the battery (on the separator, here). Further, an average particle size of the inorganic filler in the porous heat resistance layer is shown as "particle size".

TABLE 3

| | Separator | | Porous heat resistance layer | | | |
|---|---|---|---|---|---|---|
| | Thickness (μm) | Porosity A (% by volume) | Thickness (μm) | Porosity B (% by volume) | Particle size of filler | B/A |
| Example 21 | 25 | 75 | 5 | 35 | 0.5 | 0.47 |
| Example 23 | | | | | 1.0 | |
| Example 25 | | | | | 1.5 | |
| Example 27 | | | | | 2.0 | |

As shown in FIG. 8, it was found that when an average particle size of the inorganic filler is set to 1 μm or less (particularly preferably 0.2 μm to 0.7 μm), a stress applied to a foreign matter entering the battery can further be dispersed and reduced, and the internal short circuit can further properly be prevented from occurring. From this, it was shown that when an average particle size of the inorganic filler contained in the porous heat resistance layer is set to 1 vim or less, an effect of the present invention can be exerted at a higher level, and a battery that has higher short circuit strength and is excellent in reliability (resistance against foreign matter contamination) can be realized.

Although specific examples of the present invention were described in detail in the above, these are mere examples, and the present invention is not limited thereto.

What is claimed is:

1. A nonaqueous electrolyte secondary battery comprising:
    an electrode body provided with a positive electrode and a negative electrode that face each other through a separator;
    a non-aqueous electrolyte; and
    a porous heat resistance layer that is disposed at least in one of a space between the positive electrode and the separator and a space between the negative electrode and the separator and contains an inorganic filler, wherein
    a porosity of the separator is not less than 70% by volume and not more than 80% by volume; and
    a ratio of a porosity of the porous heat resistance layer with respect to the porosity of the separator is not less than 0.3 and not more than 0.6.

2. The nonaqueous electrolyte secondary battery according to claim 1, wherein an average particle size of the inorganic filler is larger than 0 μm and not more than 1 μm.

3. The nonaqueous electrolyte secondary battery according to claim 2, wherein the average particle size of the inorganic filler is not less than 0.01 μm.

4. The nonaqueous electrolyte secondary battery according to claim 3, wherein the average particle size of the inorganic filler is not less than 0.2 μm and not more than 0.7 μm.

5. The nonaqueous electrolyte secondary battery according to claim 1, wherein an average thickness of the separator is larger than 0 μm and not more than 30 μm.

6. The nonaqueous electrolyte secondary battery according to claim 5, wherein the average thickness of the separator is not less than 15 μm and not more than 30 μm.

7. The nonaqueous electrolyte secondary battery according to claim 1, wherein the porous heat resistance layer is formed on a surface of the separator.

8. The nonaqueous electrolyte secondary battery according to claim 1, wherein an average thickness of the porous heat resistance layer is not less than 3 μm and not more than 15 μm.

9. The nonaqueous electrolyte secondary battery according to claim 8, wherein the average thickness of the porous heat resistance layer is not less than 5 μm.

10. The nonaqueous electrolyte secondary battery according to claim 1, wherein the separator is formed of at least one of a polyethylene resin and a polypropylene resin.

11. The nonaqueous electrolyte secondary battery according to claim 1, wherein the inorganic filler includes at least one of alumina and alumina hydrate.

12. The nonaqueous electrolyte secondary battery according to claim 1, wherein an air permeability of the separator is not less than 50 sec/100 mL and not more than 1000 sec/100 mL.

* * * * *